(No Model.)
W. HUDSON.
NUT LOCK.
No. 562,829. Patented June 30, 1896.
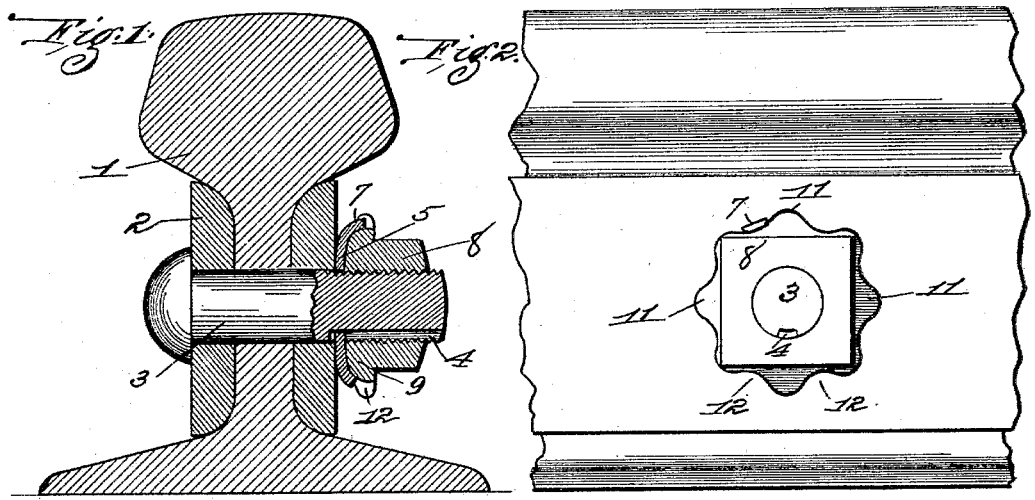
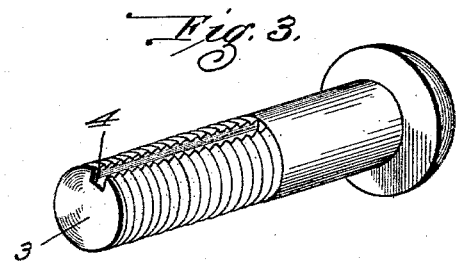
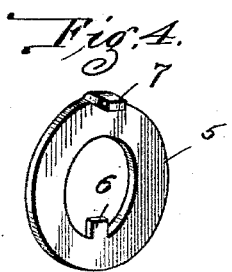 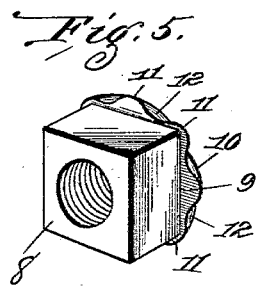
Attest
Mark P. Smith
John L. Tunison
Inventor:—
Wm Hudson
by Higdon & Higdon & Longan
Atty's.

UNITED STATES PATENT OFFICE.

WILLIAM HUDSON, OF BLACK WALNUT, MISSOURI, ASSIGNOR OF ONE-HALF TO U. S. RAGLAND, OF SAME PLACE.

NUT-LOCK.

SPECIFICATION forming part of Letters Patent No. 562,829, dated June 30, 1896.

Application filed September 23, 1895. Serial No. 563,345. (No model.)

*To all whom it may concern:*

Be it known that I, WILLIAM HUDSON, of the city of Black Walnut, St. Charles county, State of Missouri, have invented certain new and useful Improvements in Nut-Locks, of which the following is a full, clear, and exact description, reference being had to the accompanying drawings, forming a part hereof.

My invention relates to an improved nut-lock; and it consists in the novel construction, combination, and arrangement of parts hereinafter described and claimed.

In the drawings, Figure 1 is a sectional view of a rail, the same having the ordinary fish-plates located thereon, a bolt passing through said fish-plates, and the nut locked upon said bolt with my improved device. Fig. 2 is a side elevation of a rail on which my improved nut-lock is located. Fig. 3 is a view in perspective of a bolt such as is used in connection with my improved nut-lock. Fig. 4 is a view in perspective of a washer. Fig. 5 is a view in perspective of the nut as is contemplated by my invention.

Referring by numerals to the accompanying drawings, 1 indicates an ordinary track-rail; 2, the fish-plates, and 3 the bolts which pass through said rail and fish-plates in the ordinary manner. The bolts used in connection with my improved nut-lock are each provided with a rectangular groove 4, the same extending the entire length of the screw-threaded portion of said bolt.

5 indicates a washer constructed of resilient metal, such as sheet-steel, and formed integral with the inner circumference of said washer is an inwardly-projecting lug 6. Formed integral with the outer edge of the washer 5 at a point opposite the lug 6 is a lip 7, the same being bent into a plane at right angles to the washer 5.

8 indicates an ordinary nut, with one face of which is formed integral a body 9, the same having an oval face 10, and the edge of said body 9 projects a slight distance beyond the nut 8 and is formed into a series of semicircular points 11, between which are necessarily formed depressions 12.

In the use of my improved nut-lock, the bolt is first passed through the coinciding apertures formed in the fish-plates and rail, after which the washer 5 is located upon the protruding screw-threaded end of said nut, the lug 6 passing through the rectangular groove 4. The nut 8 is now located upon said bolt in the usual manner, the body 9, having the oval face, being toward the washer 5. When said nut has been manipulated a certain distance upon said bolt, the protruding lip 7 will engage against the oval face 10, and as said nut is tightened upon the bolt said lip 7 will spring and ride over the succeeding points 11, and from thence will pass into the depressions between said points, it remaining in one of said depressions when the nut has been firmly positioned against the washer 5 and upon the bolt. The washer 5 may be either slightly concaved to fit the curvature of the face of the body 9, as shown in Fig. 1, or the same may be left perfectly plain, as shown in Fig. 4.

A device of my improved construction, in addition to being very firmly locked upon the bolt, very completely locks the nut upon the bolt, and said nut can in no wise be removed unless a wrench or like tool is brought into use.

A nut-lock constructed in accordance with the foregoing description is simple, strong, and durable, is readily applied, can be manipulated very cheaply, and the nut can, if desired, be removed from the bolt without breaking or rendering inoperative any of the parts.

I claim—

The combination with the rail 1 and the fish-plates 2 of the bolt 3 having the rectangular groove 4, the washer 5 having the lug 6 and the spring-lip 7, the nut 8 having the body 9, the oval face 10, the semicircular points 11, and the depressions 12, all arranged and combined to operate in the manner set forth and for the purpose stated.

In testimony whereof I affix my signature in presence of two witnesses.

WILLIAM HUDSON.

Witnesses:
JOHN C. HIGDON,
MAUD GRIFFIN.